US012259560B2

(12) United States Patent
Wang et al.

(10) Patent No.: US 12,259,560 B2
(45) Date of Patent: Mar. 25, 2025

(54) HANDHELD CONTROLLERS WITH CHARGING AND STORAGE SYSTEMS

(71) Applicant: Apple Inc., Cupertino, CA (US)

(72) Inventors: Paul X Wang, Cupertino, CA (US); Ian P Colahan, San Jose, CA (US); Christopher T Eubank, Santa Barbara, CA (US); Christopher K Ewy, San Francisco, CA (US); Patrick T Ryan, San Francisco, CA (US); Emery A Sanford, Hillsborough, CA (US); Robert D Silfvast, Belmont, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/355,791

(22) Filed: Jul. 20, 2023

(65) Prior Publication Data
US 2024/0069352 A1 Feb. 29, 2024

Related U.S. Application Data

(60) Provisional application No. 63/400,356, filed on Aug. 23, 2022.

(51) Int. Cl.
G02B 27/01 (2006.01)
A63F 13/24 (2014.01)
H02J 50/10 (2016.01)

(52) U.S. Cl.
CPC .......... *G02B 27/0176* (2013.01); *A63F 13/24* (2014.09); *H02J 50/10* (2016.02); *G02B 2027/0169* (2013.01)

(58) Field of Classification Search
None
See application file for complete search history.

(56) References Cited

U.S. PATENT DOCUMENTS

| 8,143,850 | B2* | 3/2012 | Erickson | H02J 50/90 320/115 |
| 8,238,967 | B1* | 8/2012 | Arnold | H04M 1/6066 455/575.1 |
| 10,085,083 | B2* | 9/2018 | Minoo | H04R 1/1025 |
| 10,146,335 | B2 | 12/2018 | Balan et al. | |
| 10,147,243 | B2 | 12/2018 | Yamamoto et al. | |
| 10,502,363 | B2 | 12/2019 | Edwards et al. | |
| 10,684,654 | B2* | 6/2020 | Shin | H04M 1/724097 |
| 10,795,438 | B2 | 10/2020 | Wang | |

(Continued)

*Primary Examiner* — Kenneth Bukowski
(74) *Attorney, Agent, or Firm* — Treyz Law Group, P.C.; Kendall P. Woodruff

(57) ABSTRACT

A system may include an electronic device such as a head-mounted device and a handheld controller for controlling the electronic device. The handheld controller may have a housing with an elongated shaft extending between first and second tip portions. The handheld controller may have power receiving circuitry configured to receive power from a power source. The power source may be incorporated into an electronic device such as a wireless charging dock or stick, a battery case, or a head-mounted device. The power source may supply power through terminals that form ohmic contacts with mating terminals in the finger device or may transmit power wirelessly using capacitive coupling or inductive charging arrangements. Magnets may be used to hold and align the elongated shaft of the handheld controller on the power source.

17 Claims, 10 Drawing Sheets

(56) References Cited

U.S. PATENT DOCUMENTS

| | | | |
|---|---|---|---|
| 10,908,428 B2* | 2/2021 | Trail | G09G 5/006 |
| 10,922,583 B2 | 2/2021 | Kaehler et al. | |
| 11,042,034 B2 | 6/2021 | Sztuk et al. | |
| 11,112,932 B2 | 9/2021 | Powderly et al. | |
| 11,150,777 B2 | 10/2021 | Kaehler et al. | |
| 11,513,371 B2* | 11/2022 | Howell | G02C 11/10 |
| 11,573,677 B2 | 2/2023 | Powderly et al. | |
| 2015/0235426 A1* | 8/2015 | Lyons | A63F 13/26 |
| | | | 345/8 |
| 2017/0093453 A1* | 3/2017 | Panecki | H04R 1/1058 |
| 2017/0153672 A1* | 6/2017 | Shin | H04M 1/724097 |
| 2017/0353821 A1* | 12/2017 | Evans, V | H04W 4/80 |
| 2018/0091887 A1* | 3/2018 | Minoo | H04R 1/1025 |
| 2018/0115184 A1* | 4/2018 | Lee | H02J 50/10 |
| 2018/0314296 A1* | 11/2018 | Evans, V | G06F 1/1632 |
| 2019/0280512 A1* | 9/2019 | Park | H02J 50/12 |
| 2020/0081490 A1* | 3/2020 | Rothkopf | G06F 1/26 |
| 2020/0096774 A1* | 3/2020 | Trail | G06T 7/70 |
| 2020/0343775 A1* | 10/2020 | Yahagi | H02J 7/0063 |
| 2022/0413628 A1 | 12/2022 | Lohse et al. | |

* cited by examiner

US 12,259,560 B2

HANDHELD CONTROLLERS WITH CHARGING AND STORAGE SYSTEMS

This application claims the benefit of provisional patent application No. 63/400,356, filed Aug. 23, 2022, which is hereby incorporated by reference herein in its entirety.

FIELD

This relates generally to computer systems and, more particularly, to input devices for computer systems.

BACKGROUND

Electronic devices such as computers can be controlled using computer mice and other input accessories. In virtual reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide inadequate feedback. In a virtual reality setting, it may be especially cumbersome for the user to charge or find storage for an input device without interrupting the virtual reality experience.

SUMMARY

A system may include an electronic device such as a head-mounted device and a handheld controller for controlling the electronic device. The head-mounted device or other device may have a display configured to display virtual content that is overlaid onto real-world content.

The handheld controller may have a housing with an elongated shaft extending between first and second tip portions. The housing may have a flat surface and a curved surface.

The handheld controllers may have power receiving circuitry configured to receive power from a power source. The power source may be incorporated into an electronic device such as a wireless charging dock or stick, a battery case, or a head-mounted device. The power source may supply power through terminals that form ohmic contacts with mating terminals in the finger device or may transmit power wirelessly using capacitive coupling or inductive charging arrangements. Magnets may be used to hold and align the elongated shaft of the handheld controller on the power source.

A wireless charging stick may include flat surfaces that mate with flat surfaces on one or more handheld controllers. A wireless charging dock may include a recess defined by walls that conform to the shape of the handheld controller. A battery case may include upper and lower housing portions with one or more recesses for respectively receiving one or more handheld controllers.

A head-mounted device may include a main housing portion with displays, lenses, and other electrical components. A head strap may be used to attach the main housing portion to a user's head. Magnets may be used to temporarily store and/or charge a handheld controller on the head strap or main housing portion of the head-mounted device.

DETAILED DESCRIPTION

Figure 1:
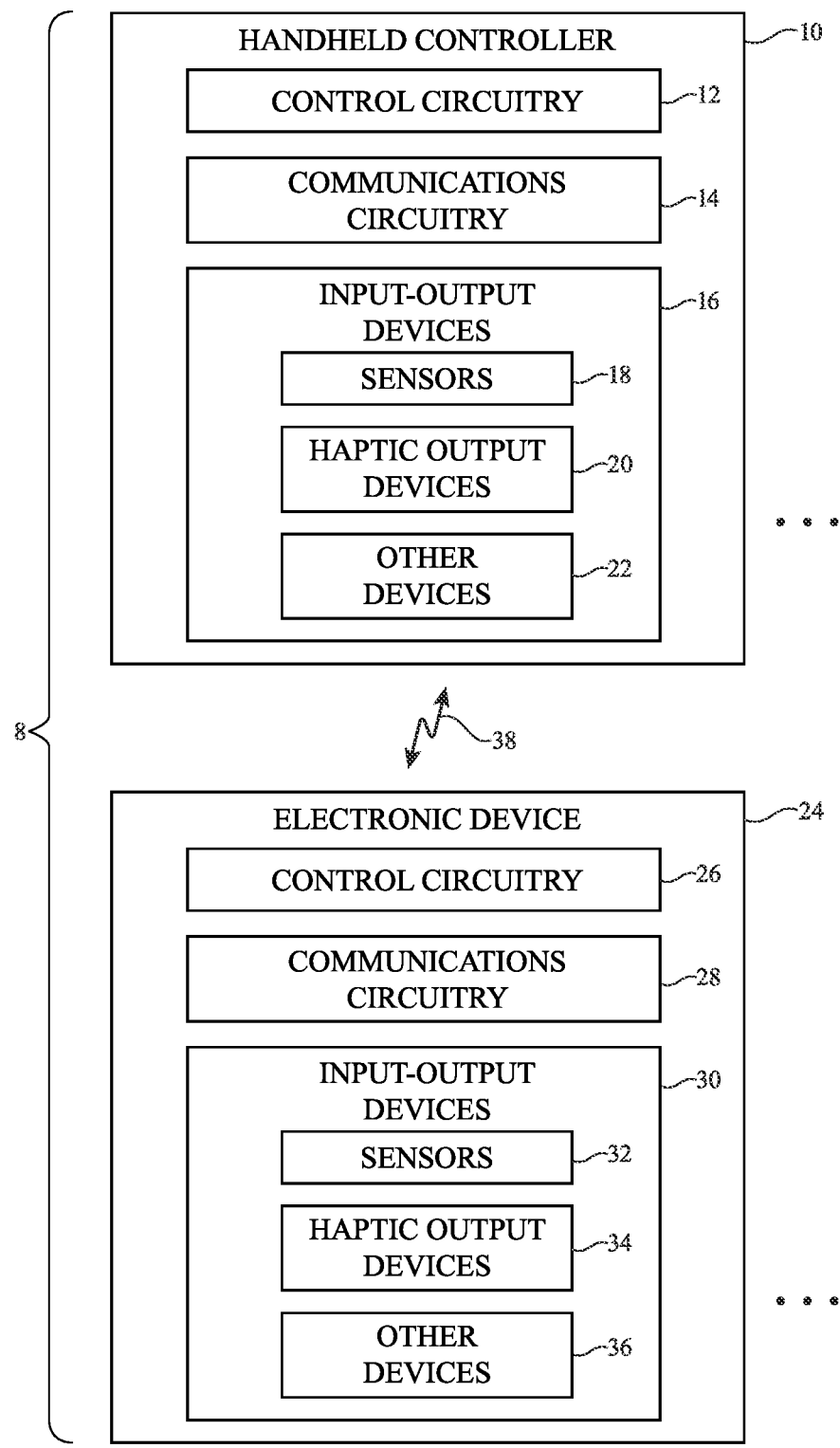
FIG. 1 is a schematic diagram of an illustrative system with a handheld controller in accordance with an embodiment.

Electronic devices that are configured to be held in the hand of a user may be used to gather user input and to provide a user with output. For example, electronic devices that are configured to control one or more other electronic devices, which are sometimes referred to as controllers, handheld controllers, or handheld input devices, may be used to gather user input and to supply output. A handheld controller may, as an example, include an inertial measurement unit with an accelerometer for gathering information on controller motions such as swiping motions, waving motions, writing movements, drawing movements, shaking motions, rotations, etc., and may include wireless communications circuitry for communicating with external equipment such as a head-mounted device, may include tracking features such as active or passive visual markers that can be tracked with an optical sensor in an external electronic device, may include input devices such as touch sensors, force sensors, buttons, knobs, wheels, etc., may include sensors for gathering information on the interactions between the handheld controller, the user's hands interacting with the controller, and the surrounding environment. The handheld controller may include a haptic output device to provide the user's hands with haptic output and may include other output components such as one or more speakers.

One or more handheld controllers may gather user input from a user. The user may use the handheld controllers to control a virtual reality or mixed reality device (e.g., head-mounted equipment such as glasses, goggles, a helmet, or other device with a display). During operation, the handheld controller may gather user input such as information on interactions between the handheld controller(s) and the surrounding environment, interactions between a user's fingers or hands and the surrounding environment, and interactions associated with virtual content displayed for a user. The user input may be used in controlling visual output on a display (e.g., a head-mounted display, a computer display, etc.). Corresponding haptic output may be provided to the user's fingers using the handheld controller. Haptic output may be used, for example, to provide the fingers of a user with a desired sensation (e.g., texture, weight, torque, pushing, pulling, etc.) as the user interacts with real or virtual objects using the handheld controller. Haptic output can also be used to create detents, to provide localized or global haptic feedback in response to user input that is supplied to the handheld controller, and/or to provide other haptic effects.

Handheld controllers can be held in one or both of a user's hands. Users can use the handheld controllers to interact with any suitable electronic equipment. For example, a user may use one or more handheld controllers to interact with a virtual reality or mixed reality system (e.g., a head-mounted device with a display), to supply input to a desktop computer, tablet computer, cellular telephone, watch, ear buds, or other accessory, to control household items such as lighting, televisions, thermostats, appliances, etc., or to interact with other electronic equipment.

FIG. 1 is a schematic diagram of an illustrative system of the type that may include one or more handheld controllers. As shown in FIG. 1, system 8 may include electronic device(s) such as handheld controller(s) 10 and other electronic device(s) 24. Each handheld controller 10 may be held in the hand of a user. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a handheld controller having an elongated marker-shaped housing configured to be grasped within a user's fingers or a housing with other shapes configured to rest in a user's hand, and device(s) 24 is a head-mounted device, cellular telephone, tablet computer, laptop computer, wristwatch device, a device with a speaker, or other electronic device (e.g., a device with a display, audio components, and/or other output components). A handheld controller with a marker-shaped housing may have an elongated housing that spans across the width of a user's hand and that can be held like a pen, pencil, marker, wand, or tool.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 28, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 30 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing interferometric sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or other suitable rotary button that rotates and that optionally can be depressed to select items of interest). Alphanumeric keys and/or other buttons may be included in devices 16 and/or 30. In some configurations, sensors 18 may include joysticks, roller balls, optical sensors (e.g., lasers that emit light and image sensors that track motion by monitoring and analyzing changings in the speckle patterns and other information associated with surfaces illuminated with the emitted light as device 10 is moved relative to those surfaces), fingerprint sensors, and/or other sensing circuitry. Radio-frequency tracking devices may be included in sensors 18 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices 10 and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in applying a sensation on a user's fingers (e.g., a sensation of weight, texture, pulling, pushing, torque, etc.) and/or otherwise directly interacting with a user's fingers. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
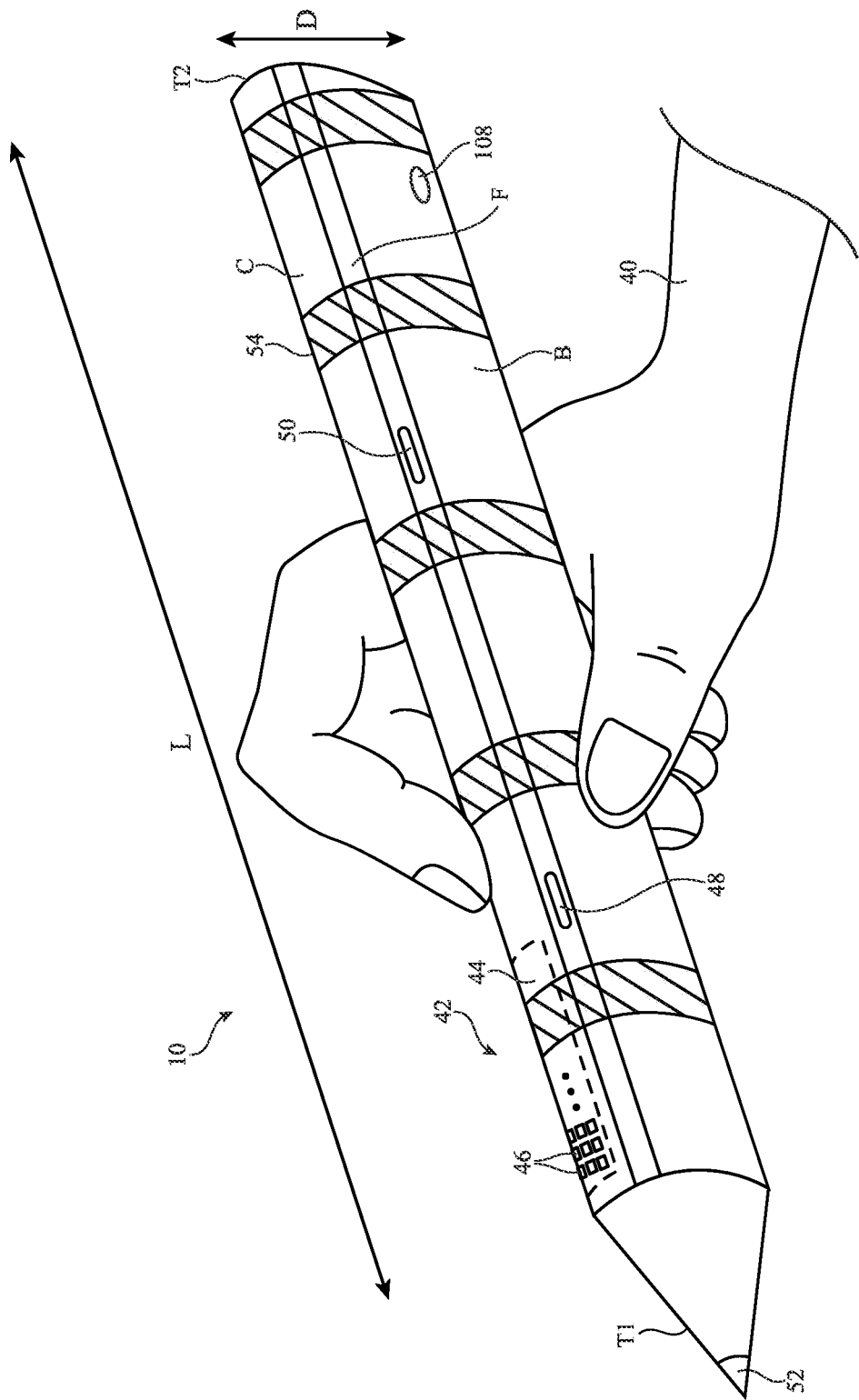
FIG. 2 is a perspective view of an illustrative handheld controller in accordance with an embodiment.

FIG. 2 is a perspective view of a user's hands (hands 40) and an illustrative handheld controller 10. As shown in FIG. 2, controller 10 may be an elongated marker-shaped electronic device that fits within the user's hand 40. The elongated shape of controller 10 allows hand 40 to hold controller 10 as if it were a pen, pencil, marker, or other writing implement. In other configurations, controller 10 may be held in hand 40 as a wand or baton would be held. In general, controller 10 may be held in hand 40 in any suitable manner (e.g., at the end, in the middle, between two, three, four, or all five fingers, with both hands, etc.).

A user may hold one or more of devices 10 simultaneously. For example, a user may hold a single one of devices 10 in the user's left or right hand. As another example, a user may hold a first device 10 in the user's left hand and a second device 10 in the user's right hand. Arrangements in which multiple devices 10 are held in one hand may also be used. Configurations in which devices 10 have bodies that are held within a user's hands are sometimes described herein as an example.

Control circuitry 12 (and, if desired, communications circuitry 14 and/or input-output devices 16) may be contained entirely within device 10 (e.g., in housing 54) and/or may include circuitry that is located in an external structure (e.g., in an external electronic device such as device 24, a console, a storage case, etc.).

In general, electrical components such as control circuitry 12, communications circuitry 14, and/or input-output devices 16 (e.g., sensors 18, haptic output devices 20, and/or other devices 22) may be mounted within and/or on the surface(s) of controller housing 54 in any suitable locations.

As shown in FIG. 2, housing 54 may have an elongated marker shape, elongated tube shape, elongated cylindrical shape, and/or any other elongated shape. Housing 54 which may sometimes be referred to as an enclosure, body, or case, may be formed of plastic, glass, ceramics, fiber composites, metal (e.g., stainless steel, aluminum, etc.), fabric, other suitable materials, or a combination of any two or more of these materials. Housing 54 may be formed using a unibody configuration in which some or all of housing 54 is machined or molded as a single structure or may be formed using multiple structures (e.g., an internal frame structure, one or more structures that form exterior housing surfaces, etc.). Housing 54 may form outer housing walls, tip portions, and/or internal support structures for device 10. Housing 54 may have a length L between 140 mm and 150 mm, between 130 mm and 160 mm, between 100 mm and 200 mm, between 120 mm and 160 mm, greater than 180 mm, less than 180 mm, or any other suitable length. The diameter D of housing 54 may be between 12 mm and 14 mm, between 10 mm and 15 mm, between 11 mm and 16 mm, between 15 mm and 20 mm, between 18 mm and 25 mm, greater than 25 mm, less than 25 mm, or any other suitable diameter.

Housing 54 may have one or more curved surfaces and one or more planar surfaces. In the illustrative example of FIG. 2, device 10 has a curved surface C that wraps around a first portion of device 10 and a flat surface F that extends along a second portion of device 10. If desired, flat surface F may be located on a first side of device 10 and curved surface C may be located on a second opposing side of device 10. Curved surface C and flat surface F wrap around device 10 to form an elongated tube shape that surrounds an elongated interior space for housing internal components such as control circuitry 12, communications circuitry 14, and input-output devices 16. Housing 54 may have an elongated shaft portion such as shaft B extending between first and second tip portions such as tip portion T1 at a first end of device 10 and tip portion T2 at a second opposing end of device 10. One or both of housing tip portions T1 and T2 may be removable from the main elongated shaft B between tip portions T1 and T2.

Ultrasonic sensors, optical sensors, inertial measurement units, touch sensors such as capacitive touch sensor electrodes, strain gauges and other force sensors, radio-frequency sensors, and/or other sensors may be used in gathering sensor measurements indicative of the activities of device 10 and/or hand 40 holding device 10.

In some configurations, controller position, movement, and orientation may be monitored using sensors that are mounted in external electronic equipment (e.g., in a computer or other desktop device, in a head-mounted device or other wearable device, and/or in other electronic device 24 that is separate from device 10). For example, optical sensors such as images sensors that are separate from device 10 may be used in monitoring device 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices. The light-emitting devices may include light-emitting diodes, lasers (e.g., laser diodes, vertical cavity surface-emitting lasers, etc.), or other light sources and may operate at visible wavelengths, ultraviolet wavelengths, and/or infrared wavelengths. The light-emitting devices may be arranged in an asymmetric pattern on housing 54 and may emit light that is detected by an image sensor, depth sensor, and/or other light-based tracking sensor circuitry in device 24 (e.g., a head-mounted device, desktop computer, stand-alone camera-based monitoring systems, and/or other electrical equipment with an image sensor or other tracking sensor circuitry). By processing the received patterned of emitted light, device 24 can determine the position, orientation, and/or motion of device 10. If desired, the light-emitting devices can be removable and/or customizable (e.g., a user can customize the location and type of light-emitting devices).

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other controller tracking arrangements may be used, if desired. In some arrangements, user input for controlling system 8 can include both user input to controller 10 and other user input (e.g., user eye gaze input, user voice input, etc.). For example, gaze tracking information such as a user's point-of-gaze measured with a gaze tracker can be fused with controller input to controller 10 when controlling device 10 and/or devices 24 in system 8. A user may, for example, gaze at an object of interest while device 10 uses one or more of sensors 18 (e.g., an accelerometer, force sensor, touch sensor, etc.) to gather information such as tap input (tap input in which a user taps on device 10 with one or more fingers, tap input in which device 10 taps a table top or other external surface or object, and/or any other tap input resulting in measurable forces and/or accelerometer output from device 10), double-tap input, force input, controller gestures (tapping, swiping, twirling, shaking, writing, drawing, painting, sculpting, gaming, and/or other gestures with device 10, gestures on external surfaces with device 10, gestures on external objects with device 10, gestures interacting with virtual objects, gestures with controller 10 in the air, etc.), drag and drop operations associated with objects selected using a lingering gaze or other point-of-gaze input, etc. The controller input from controller 10 to system 8 may include information on finger orientation, position, and/or motion relative to controller 10, may include information on how forcefully a finger is pressing against surfaces of controller 10 (e.g., force information), may include information on how forcefully controller 10 is pressed against an object or external surface (e.g., how forcefully a tip portion such as tip portion T1 presses against an external surface), may include controller pointing input (e.g., the direction in which controller 10 is pointing), which may be gathered using radio-frequency sensors among sensors 18 and/or other sensors in device(s) 10, and/or may include other controller input.

By correlating user input from a first of devices 10 with user input from a second of devices 10 and/or by otherwise analyzing controller sensor input, multi-device input may be detected and used in manipulating virtual objects or taking other actions in system 8. Consider, as an example, the use of a tap gesture with device 10 to select a virtual object associated with a user's current point-of-gaze. Once the virtual object has been selected based on the direction of the user's point-of-gaze (or controller pointing direction input) and based on the tap gesture input or other user input, further user input gathered with one or more devices 10 may be used to rotate and/or otherwise manipulate the virtual object. For example, information on controller movement (e.g., rotational movement) may be gathered using an internal measurement unit or other sensor 18 in device(s) 10 and this rotational input may be used to rotate the selected object. In some scenarios, an object may be selected based on point-of-gaze (e.g., when a user's point-of-gaze is detected as being directed toward the object) and, following selection, object attributes (e.g., virtual object attributes such as virtual object appearance and/or real-world object attributes such as the operating settings of a real-world device) can be adjusted using strain gauge input, touch sensor input, controller orientation input (e.g., to rotate a virtual object, etc.).

If desired, gestures such as air gestures (three-dimensional gestures) with device 10 may involve additional input. For example, a user may control system 8 using hybrid gestures that involve movement of device(s) 10 through the air (e.g., an air gesture component) and that also involve contact between device 10 and one or more fingers of hand 40. As an example, an inertial measurement unit in device 10 and/or a camera in device 24 may detect user movement of device 10 through the air (e.g., to trace out a path) while a sensor 18 in device 10 such as a two-dimensional touch sensor, a force sensor, or other sensor 18 detects force input, touch input, or other input associated with contact to device 10.

The sensors in device 10 may, for example, measure how forcefully a user is moving device 10 against a surface (e.g., in a direction perpendicular to the surface) and/or how forcefully a user is moving device 10 along a surface (e.g., shear force in a direction parallel to the surface). The direction of movement of device 10 can also be measured by the force sensors and/or other sensors 18 in device 10.

Information gathered using sensors 18 such as force sensor input gathered with a force sensor, motion data gathered with a motion sensor (e.g., pointing input, rotations, etc.), location information indicating the location of controller 10, touch input gathered with a touch sensor, and other user input may be used to control external equipment such as device 24. For example, control circuitry 12 may send control signals to device 24 that include instructions to select a user interface element, instructions to scroll display content, instructions to select a different input function for controller 10 (e.g., to switch from using controller 10 as a drawing or writing implement to using controller 10 as a pointing device or game piece), instructions to draw a line or type a word on a display in device 24, instructions to adjust operational settings of device 24, instructions to manipulate display content on device 24, and/or instructions to take any other suitable action with device 24. These control signals may be sent in addition to or instead of providing feedback to sensor input from device 10 (e.g., haptic output, audio output, adjusting operational settings of device 10, etc.).

In the illustrative configuration of FIG. 2, device 10 includes touch sensor 42. Touch sensor 42 may be formed from an array of capacitive touch sensor electrodes such as electrodes 46 overlapping one or more surfaces of housing 54 such as curved surface C, flat surface F, and/or surfaces on tip portions T1 and T2. Touch sensor 42 may be configured to detect swipes, taps, multitouch input, squeeze input, and/or other touch input. In some arrangements, touch sensor 42 is formed from a one-dimensional or two dimensional array of capacitive electrodes 46. In some arrangements, touch sensor 42 may be a strain gauge that detects squeeze input to housing 54 (e.g., when a user squeezes or pinches device 10 between the user's fingers). Touch sensor 42 may be used to gather touch input such as input from direct contact and/or close proximity with a different finger of the user or other external object. In the example of FIG. 2, touch sensor 42 overlaps touch input area 44 on curved surface C of device 10. If desired, additional touch input may be gathered in adjacent areas such as flat surface F of housing 54. If desired, touch sensor 42 may include other types of touch sensing technologies such as optical touch sensors, acoustic-based touch sensors, etc. Touch sensor 42 may span the length L of device 10, may span only partially along length L of device 10, may cover some or all of curved surface C, may cover some or all of flat surface F, and/or may cover some or all of tip portions T1 and T2. If desired, touch sensor 42 may be illuminated, may overlap a display (e.g., to form a touch-sensitive display region on device 10), may overlap an indicator or textured surface, and/or may otherwise be visually or tangibly distinct from the surrounding non-touch-sensitive portions of housing 54 (if desired).

In addition to or instead of touch sensor 42, device 10 may include one or more other user input devices such as user input device 48. User input device 48 may be a mechanical input device such as a pressable button, a rotating knob, a rotating wheel, a rocker switch, a slider, or other mechanical input device, a force sensor such as a strain gauge or other force sensor, an optical sensor such as a proximity sensor, a touch sensor such as a capacitive, acoustic, or optical touch sensor, and/or any other suitable input device for receiving input from a user's hand 40. If desired, one of haptic output devices 20 such as an actuator may be used to provide haptic feedback in response to user input to device 48. For example, input device 48 may be a touch-sensitive button that does not physically move relative to housing 54, but the user may feel a localized button click sensation from haptic output that is provided from an actuator 20 overlapping device 48.

In addition to or instead of touch sensor 42 and input device 48, device 10 may include one or more sensors at tip portions T1 and T2. For example, tip portion T1 and/or tip portion T2 may be force-sensitive. As shown in FIG. 2, device 10 may include sensor 52. Sensor 52 may be located at one or both of tip portions T1 and T2 and/or may be located elsewhere in device 10 such as at a location along shaft B of device 10. Shaft B, which may sometimes be referred to as a cylindrical housing, may form an elongated main body portion of housing 54 of device 10 that extends between tip T1 and tip T2. One or more of tip portions T1 and T2 may be removable and may sometimes be referred to as a cap, a writing tip, etc. Sensors at tip portions T1 and T2 such as sensor 52 may include a device position sensor (e.g., an optical flow sensor having a light source that illuminates a portion of a surface that is contacted by device 10 and having an image sensor configured to determine a location of device 10 on the surface and/or to measure movement of the electronic device relative to the surface based on captured images of the illuminated portion, a mechanical position sensor such as an encoded wheel that tracks movements of device 10 on the surface, or other device position sensor), a force sensor (e.g., one or more strain gauges, piezoelectric force sensors, capacitive force sensors, and/or any other suitable force sensor), an optical proximity sensor such a light-emitting diode and light detector, a camera (e.g., a one-pixel camera or an in image sensor with a two-dimensional array of pixels), and/or other sensor.

Device 10 may circuitry for receiving wired and/or wireless power. For example, wired power may be conveyed to device 10 through a charging port such as charging port 108, and wireless power may be conveyed to device 10 through capacitively coupled contacts and/or a inductive charging coil such as coil 50. If desired, device 10 may only receive wired power and coil 50 may be omitted. In other arrangements, device 10 may only receive wireless power and charging port 108 may be omitted (or port 108 may serve as a data port, audio port, or other suitable port). In arrangements where device 10 includes circuitry for receiving wireless power, power can be conveyed wirelessly between device 10 and an external electronic device such as device 24 (e.g., a head-mounted device, a wireless charging mat, a storage case, a battery case, a wireless charging puck, or other electronic device). As an example, contacts (e.g., metal pads) may be capacitively coupled (without forming ohmic contact) to allow power to be transferred and/or power can be conveyed using a wireless power transmitter with a coil in device 24 to transmit wireless power signals to a wireless power receiver with a coil in device 10. Inductive power transfer techniques may be used (e.g., wireless power can be transmitted using one or more wireless power transmitting coils in device 24 and transmitted wireless power signals can be received in a power receiving circuit in device 10 using a power receiving coil such as coil 50). Received alternating-current wireless power signals from device 24 can be converted to direct-current power using a rectifier in device 10 for charging a battery in device 10 and/or for powering circuitry in device 10. In configurations in which the power receiving circuit of device 10 receives power via a wired connection (e.g., using terminals), the power receiving circuit in device 10 may provide the received power to a battery and/or other circuitry in device 10.

To help align wireless charging coil 50 in device 10 with a wireless charging coil in device 24 and/or to otherwise hold device 10 to a power source or other device (e.g., device 24 of FIG. 1), device 10 and device 24 may be provided with mating alignment features (e.g., mating protrusions and recesses and/or other interlocking alignment structures (e.g., key and keyhole structures that allow device 10 and/or device 24 to interlock when engaged by twisting or other locking motions), magnets (or ferromagnetic elements such as iron bars), and/or other alignment structures.

In configurations in which device 10 includes magnetic attachment structures (e.g., magnets, magnetic material that is attracted to magnets, or other magnetic attachment structures), device 10 may be held against the interior and/or exterior of device 24 using the magnetic attachment structures. For example, device 24 may be a battery case with a groove or other recess that receives device 10. Magnetic attachment structures in device 24 (e.g., near the groove) and in device 10 may cooperate (magnetically attach) to help secure and align device 10 within the interior of the case (e.g., without allowing device 10 to rattle excessively inside the case). As another example, device 24 may be a head-mounted device (e.g., goggles and/or glasses) or a strap or other wearable device. In this type of arrangement, magnetic attachment structures may hold device 10 against an exterior surface of device 24 (e.g., against a portion of the housing of a pair of goggles or glasses such as along the frame of a pair of glasses, to the front, top, or side surface of a pair of goggles, etc.) or within a recess in the housing of device 24. Magnets and other alignment features may be located near coil 50 or may be located in other portions of housing 54.

Figure 3:
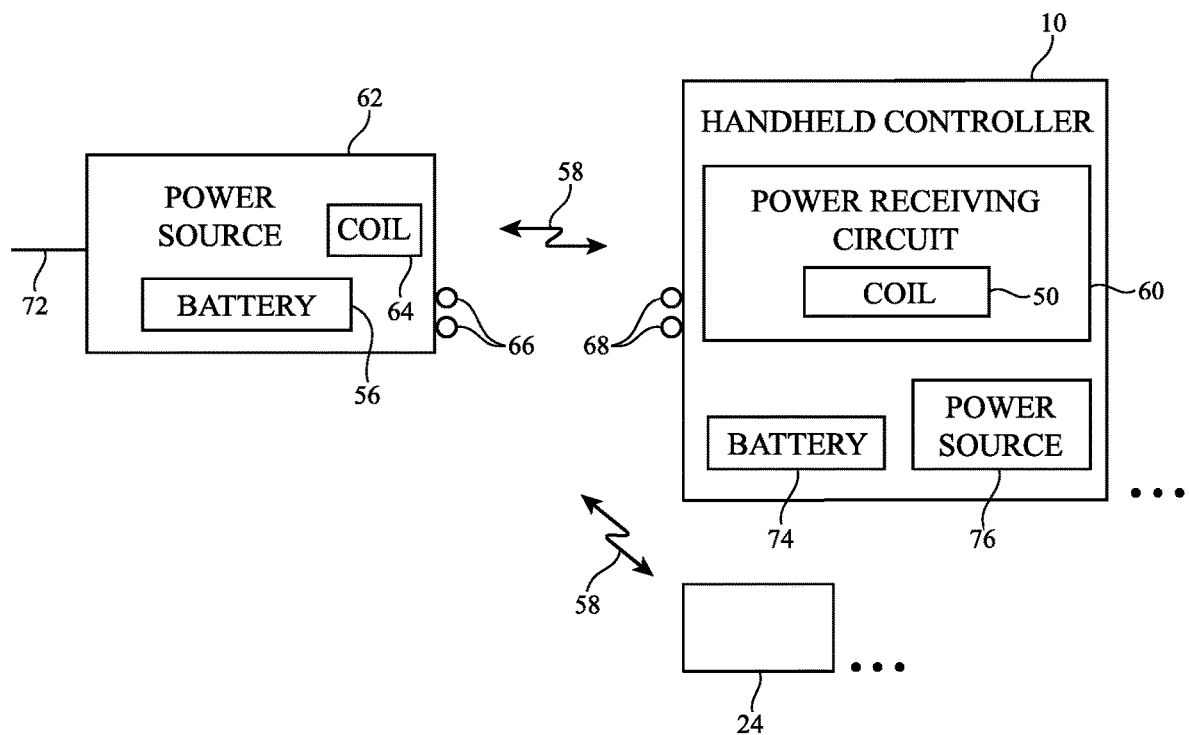
FIG. 3 is a diagram of an illustrative system with a power source and a handheld controller in accordance with an embodiment.

Device 10 may include a battery such as battery 74 of FIG. 3. Power can be conveyed to device 10 from an external power source such as power source 62 to power circuitry in device 10 and/or to charge battery 74. Power source 62 may be a stand-alone wired and/or wireless charging device (e.g., a wireless charging puck, a wireless and/or wired charging stand, dock, or base station, a wireless charging mat, or other wired and/or wireless power device) and/or may be incorporated into one or more of devices 24 for providing device 10 with power.

If desired, device 10 may also include an internal power source such as internal power source 76. Power source 76 may be an energy harvesting device. With one illustrative configuration, power source 76 is a solar cell. The solar cell may convert ambient light (e.g., sunlight, etc.) into electrical power for powering device 10 (e.g., to power circuitry in device 10 and/or to charge battery 74). If desired, power source 76 may be an energy harvesting device such as an electromechanical system or piezoelectric component that coverts kinetic energy (e.g., kinetic energy associated with vibrations and/or other movement of device 10 as device 10 is worn on a user's finger) to into electrical power for powering device 10. Energy may also be harvested using a thermoelectric device that converts heat into electrical power, or other energy harvesting devices.

External power source 62 may receive wall outlet power (mains alternating-current power) at input 72 and/or may contain a battery such as battery 56 for supplying power source 62 with direct-current power. Power can be conveyed from power source 62 (e.g., a stand-alone power source such as base station or dock or a power source integrated into one of devices 24 such as a head-mounted device) to device 10 using contacts 66 (e.g., positive and ground terminals) on power source 62 and matching ohmically-contacted contacts 68 on device 10 (e.g., positive and ground terminals in a power receiving circuit in device 10). If desired, power can be conveyed wirelessly between device 24 and device 10. As an example, contacts 66 and 68 (e.g., metal pads) may be capacitively coupled (without forming ohmic contact) to allow power to be transferred and/or power can be conveyed using a wireless power transmitter with a coil in source 62 to transmit wireless power signals (e.g., electromagnetic signals 58) to a wireless power receiver with a coil in device 10 (and/or devices 24). Inductive power transfer techniques may be used (e.g., wireless power can be transmitted using one or more wireless power transmitting coils in source 62 such as wireless power transmitting coil 64 and transmitted wireless power signals can be received in power receiving circuit 60 using power receiving coil 50). Received alternating-current wireless power signals from coil 50 can be converted to direct-current power using a rectifier in power receiving circuit 60 for charging battery 74 and/or for powering circuitry in device 10. In configurations in which the power receiving circuit of device 10 receives power via a wired connection (e.g., using terminals 68), the power receiving circuit may provide the received power to battery 74 and/or other circuitry in device 10.

Figure 4:
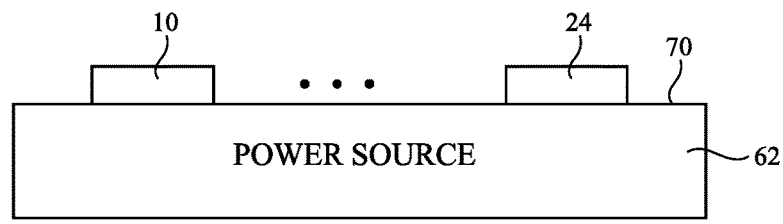
FIG. 4 is a side view of an illustrative power source such as a charging surface and associated electronic devices such as a handheld controller and other devices that are being wirelessly charged in accordance with an embodiment.

In the example of FIG. 4, power source 62 has a planar housing or other housing with a planar charging surface so that power source 62 can serve as a wireless charging mat. Device(s) 10 and/or device(s) 24 can be wirelessly charged by power source 62 when placed in the vicinity of power source 62 (e.g., on charging mat surface 70). Configurations in which wireless power signals can be transmitted and received over larger distances (e.g., at least 1 cm, at least 10 cm, at least 100 cm, at least 1 m, at least 10 m, less than 20 m, less than 2 m, less than 200 cm, less than 20 cm, less than 5 cm, or other suitable distance) may also be used.

Figure 5:
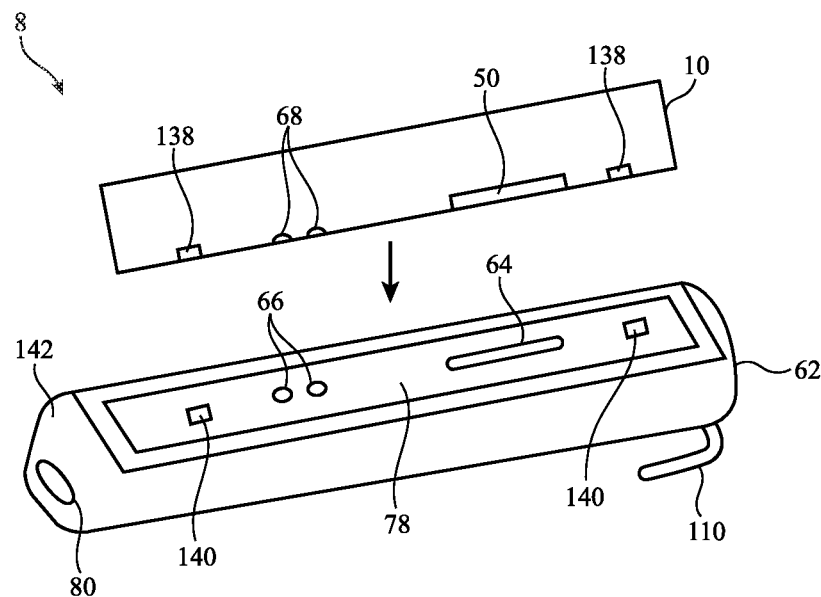
FIG. 5 is a perspective view of an illustrative handheld controller and associated charging dock that receives the handheld controller in accordance with an embodiment.

FIG. 5 shows an illustrative example in which power source 62 forms a docking or base station for storing and/or charging device 10. As shown in FIG. 5, power source 62 may have an elongated housing 142 with slightly larger dimensions than handheld controller 10. Housing 142, which may sometimes be referred to as an enclosure, body, or case, may be formed of plastic, glass, ceramics, fiber composites, metal (e.g., stainless steel, aluminum, etc.), fabric, other suitable materials, or a combination of any two or more of these materials. Housing 142 may be configured to rest on a surface (e.g., a table top surface such that recess 78 faces away from the table top surface), and/or may be mounted to an external object. For example, power source 62 may include a clip such as clip 110 that allows power source 62 to be attached to the user's clothing, a head-mounted device (e.g., clip 110 may be coupled to a head band or strap of a head-mounted device) or other electronic device 24, a wall, etc.

Housing 142 may have a recess for receiving device 10 such as recess 78. The interior surfaces of housing 142 that define recess 78 may have shapes that match the shape of device 10. For example, if device 10 has a circular cross-sectional shape, recess 78 may be defined by curved walls with a semi-circular cross-section (or a cross-section that forms less than half of a circle). If device 10 has a rectangular cross-sectional shape, recess 78 may be defined by planar walls with a cross-section that forms part of a rectangle. Arrangements in which recess 78 is formed by walls with curved portions and planar portions (e.g., to accommodate curved surface C and flat surface F of device 10 of FIG. 2) may also be used. Recess 78 may be deep so that device 10 is contained entirely within recess 78, or recess 78 may be shallow such that a portion of device 10 protrudes above the upper surface of housing 142 of power source 62.

Power source 62 may be used to store and charge device 10. When device 10 is no longer being used and/or is in need of charging, a user may place device 10 within recess 78 of power source 62. Power source 62 may include a coil such as wireless charging coil 64 and/or may include other charging circuitry such as contacts 66. Wireless charging coil 64 may transmit wireless power to power receiving coil 50 of device 10. Additionally or alternatively, power may be conveyed to device 10 via capacitive coupling and/or ohmic contact between contacts 66 and contacts 68. The example of FIG. 5 in which power source 62 includes both contacts 66 and coil 64 is merely illustrative. If desired, power source 62 may include coil 64 without including contacts 66, or may include contacts 66 without including coil 64. Power source 62 may receive wireless power, may receive wall outlet power (mains alternating-current power) at port 80, and/or may contain a battery (e.g., battery 56 of FIG. 3) for supplying power source 62 with direct-current power.

If desired, power source 62 and/or device 10 may include alignment features for helping align charging circuitry (e.g., contacts 66 and/or coil 64) with associated power receiving circuitry in device 10. Alignment features may include mating or interlocking surfaces, mating protrusions and recesses, other interlocking alignment structures (e.g., key and keyhole structures that allow device 10 and/or power source 62 to interlock when engaged by twisting or other locking motions), magnets (or ferromagnetic elements such as iron bars), and/or other alignment structures. In some arrangements, recess 78 may be defined by walls that have surface features matching surface features of device 10. For example, walls of recess 78 may include a curved portion and a flat portion, such that coil 50 is aligned with coil 64 when curved surface C of device 10 meets the curved portion of recess 78 and flat surface F of device 10 meets the flat portion of recess 78.

In some arrangements, magnetic alignment structures may be used to help align wireless charging coil 50 in device 10 with wireless charging coil 64 of power source 62. As shown in FIG. 5, for example, device 10 may include magnets 138 and power source 62 may include magnets 140. Magnets 138 and 140 may include permanent magnets and/or structures formed from magnetic material (e.g., iron bars or other ferromagnetic members that are attracted to magnets such as electromagnets and/or permanent magnets). Magnets 138 and 140 may include north and south poles that are arranged such that magnets 140 are attracted to magnets 138 when coil 50 is aligned with coil 64 (and/or when contacts 66 are aligned with contacts 68).

Figure 6:
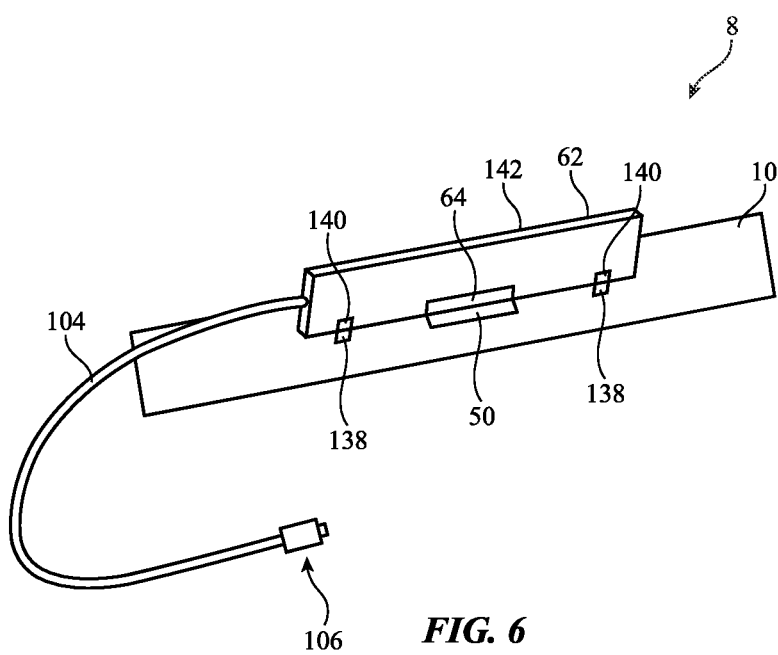
FIG. 6 is a perspective view of an illustrative handheld controller and associated charging stick that attaches to the handheld controller in accordance with an embodiment.

FIG. 6 shows an illustrative example in which power source 62 is integrated into a charging stick that attaches to device 10. As shown in FIG. 6, housing 142 may have an elongated shape with a rectangular cross-section. The outer surfaces of housing 142 may be flat. This allows one of the flat surfaces of housing 142 to mate with the flat surface F of device 10. This is merely illustrative, however. If desired, housing 142 may have a concave outer surface that conforms the convex outer surface C of device 10 (FIG. 2). Power source 62 may have smaller dimensions than device 10 (as shown in the example of FIG. 6), or power source 62 may have larger dimensions than device 10. If desired, power source 62 may be used to charge multiple devices 10 at the same time. For example, a first surface of power source 62 may be coupled to a first handheld controller 10 and a second surface of power source 62 may be coupled to a second handheld controller 10. Power source 62 may include multiple coils and/or multiple contacts for providing power to multiple devices 10, if desired.

Power source 62 and/or device 10 may include alignment features for helping align charging circuitry in power source 62 (e.g., contacts 66 and/or coil 64) with associated power receiving circuitry in device 10 (e.g., contacts 68 and/or coil 64). Alignment features may include mating or interlocking surfaces, mating protrusions and recesses, other interlocking alignment structures (e.g., key and keyhole structures that allow device 10 and/or power source 62 to interlock when engaged by twisting or other locking motions), magnets (or ferromagnetic elements such as iron bars), and/or other alignment structures.

In some arrangements, magnetic alignment structures may be used to help align wireless charging coil 50 in device 10 with wireless charging coil 64 of power source 62. As shown in FIG. 6, for example, device 10 may include magnets 138 and power source 62 may include magnets 140. Magnets 138 may include permanent magnets and/or structures formed from magnetic material (e.g., iron bars or other ferromagnetic members that are attracted to magnets such as electromagnets and/or permanent magnets). Magnets 138 and 140 may include north and south poles that are arranged such that magnets 140 are attracted to magnets 138 when coil 50 is aligned with coil 64 (and/or when contacts 66 are aligned with contacts 68). This helps snap power source 62 to the correct location on device 10 for wireless charging.

When device 10 is in need of charging, a user may bring housing 142 close to device 10. Magnets 138 and magnets 140 may be attracted to one another and power source 62 may be snapped to the appropriate location on device 10 such that coil 50 of device 10 is aligned with coil 64 of power source 62 (and/or such that contacts 68 of device 10 are aligned with contacts 66 of power source 62). Power source 62 may receive wireless power, may receive wall outlet power (mains alternating-current power) via cable 104 and connector 106, and/or may contain a battery (e.g., battery 56 of FIG. 3) for supplying power source 62 with direct-current power.

Figure 7:
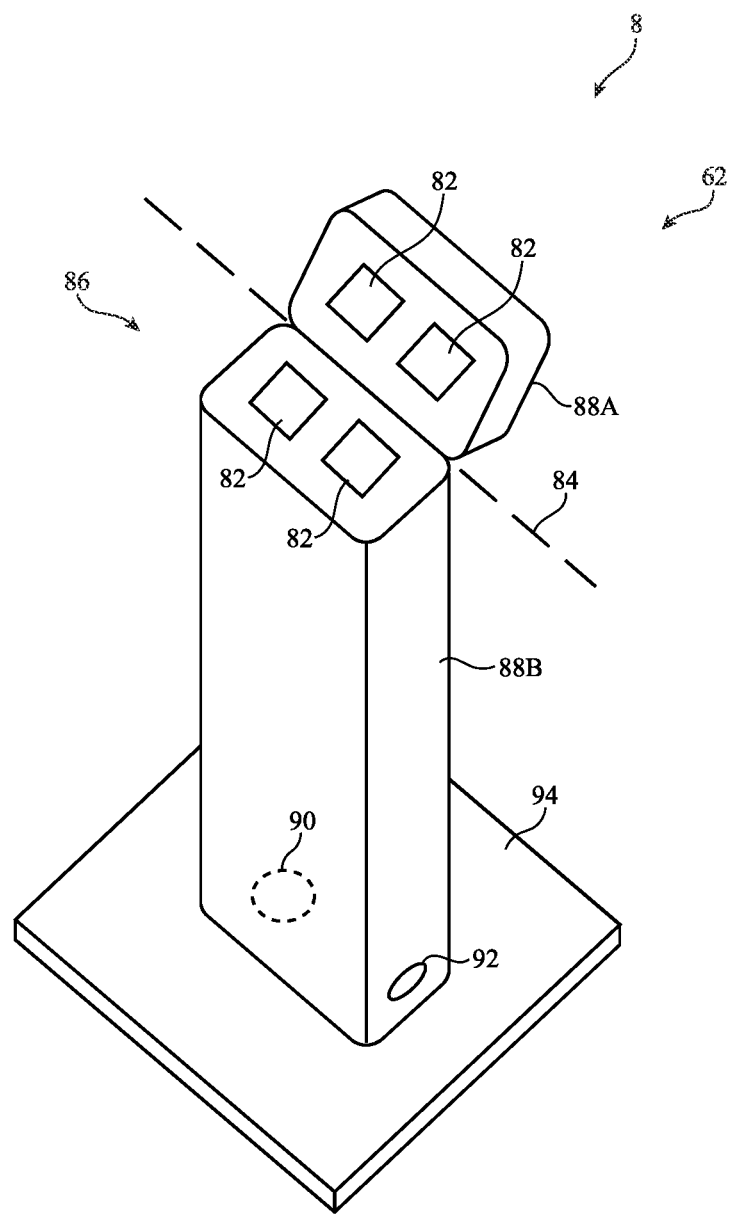
FIG. 7 is a perspective view of an illustrative battery case with a hinged lid for storing and charging one or more handheld controllers in accordance with an embodiment.

As shown in FIG. 7, power source 62 may be incorporated into a storage case such as case 86 (e.g., a storage enclosure for device 10, which may sometimes be referred to as a battery case). In this type of arrangement, case 86 may include power source 62 (e.g., a power source with a battery) for charging device 10 when device 10 is placed within the case. In the illustrative configuration of FIG. 7, case 86 has a first portion (e.g., a first housing portion) such as portion 88A that rotates about rotational (hinge) axis 84 relative to a second portion (e.g., a second housing portion) such as portion 88B. Flexible housing portions (e.g., portions of a plastic layer), interlocking metal hinge members, and/or other hinge structures along axis 84 may be provided to allow first housing portion 88A to rotate relative to second housing portion 88B.

One or more recesses 82 (e.g., device-shaped grooves or other structures) may be formed in the first portion 88A and/or second portion 88B of the housing of case 86 and may be configured to receive device 10 for storage within the interior of case 86. The interior surfaces of case 86 that define recess 82 may have shapes that match the shape of device 10. For example, if device 10 has a circular cross-sectional shape, recesses 82 may be defined by curved walls with circular cross-sections. If device 10 has a rectangular cross-sectional shape, recesses 82 may be defined by planar walls with rectangular cross-sections. Arrangements in which recesses 82 are defined by walls with curved portions and planar portions (e.g., to mate with curved surface C and flat surface F of device 10 of FIG. 2) may also be used.

In the example of FIG. 7, upper and lower housing portions 88A and 88B of case 86 each include first and second openings 82 for respectively receiving first and second handheld controllers 10 (FIG. 2). A first handheld controller 10 may be received with a first opening 82 of lower housing portion 88B and a second handheld controller 10 may be received within a second opening 82 of lower housing portion 88B. When the lid formed by upper housing portion 88A is closed, the first handheld controller 10 will be partially contained within a first opening in upper housing portion 88A and the second handheld controller 10 will be partially contained within a second opening in upper housing portion 88A. This is merely illustrative. If desired, case 86 may have only one recess 82 for storing and charging a single handheld controller 10, or case 86 may include more than two recesses 82 for storing and charging more than two handheld controllers 10.

Power source 62 may receive wireless power, may receive wall outlet power (mains alternating-current power) via port 92, and/or may contain a battery (e.g., battery 56 of FIG. 3) for supplying power source 62 with direct-current power. In arrangements where case 86 receives wireless power, a magnet such as magnet 90 in case 86 may interact with a corresponding magnetic base such as base 94 (e.g., a stand-alone support structure, a portion of a charging mat with a power source, etc.). As described in connection with the preceding figures, magnetic structures (e.g., one or more permanent magnets) may be formed inside battery case 86 to help hold and/or align handheld controller 10 (e.g., so that a user may place device 10 loosely in a recess 82, after which the magnets or other magnetic structures in the case and/or device 10 may pull device 10 completely into recess 82). Magnetic structures (e.g., a permanent magnet) in case 86 may also be used to temporarily secure device 10 to the outer surface of the case, if desired.

Figure 8:
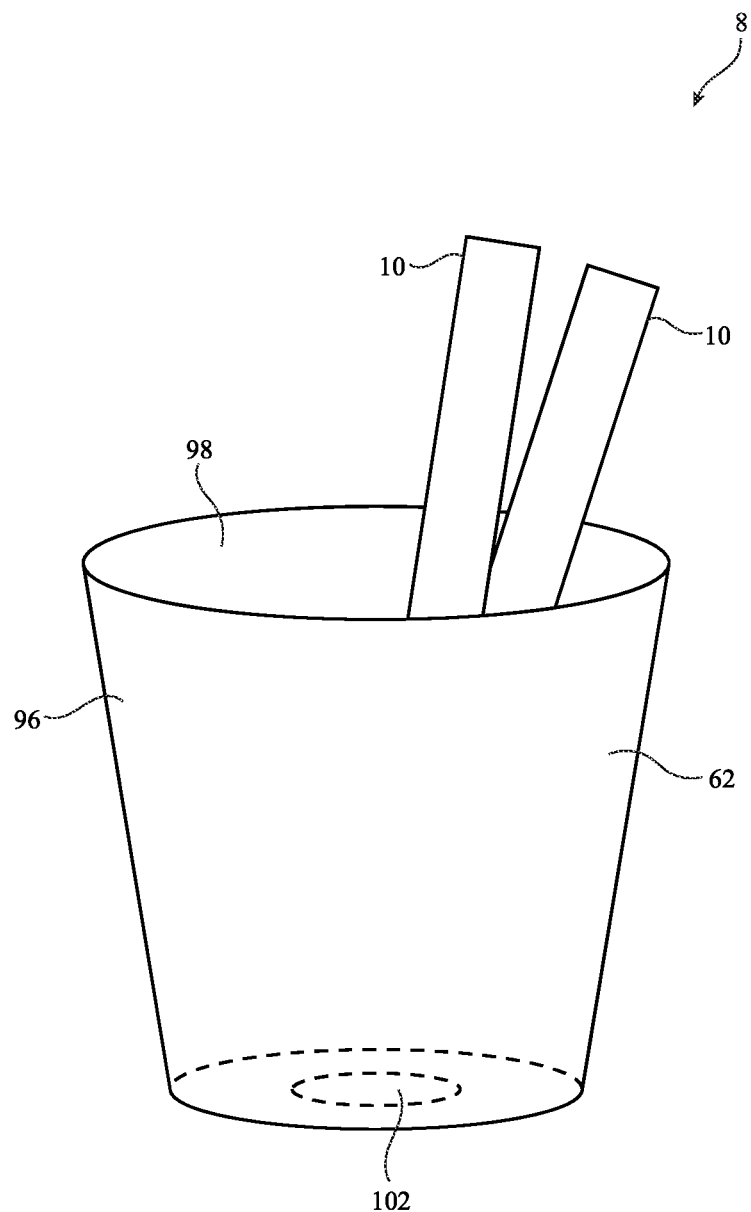
FIG. 8 is a perspective view of an illustrative charging cup for storing and charging one or more handheld controllers in accordance with an embodiment.

In the example of FIG. 8, power source 62 may be incorporated into a storage cup such as storage cup 96. In this type of arrangement, storage cup 96 may include power source 62 (e.g., a power source with a battery) for charging device 10 when device 10 is placed within storage cup 96. Storage cup 96 may include have a recess such as recess 98 for receiving one or more handheld controllers 10. Storage cup 96 may include one or more alignment features at the base of cup 96. For example, alignment feature 102 may help gather the tips of handheld controllers 10 in the appropriate location for charging. Alignment feature 102 may include magnets, recesses, or other alignment structures. Storage cup 96 may receive wireless power, may receive wall outlet power (mains alternating-current power), and/or may contain a battery (e.g., battery 56 of FIG. 3) for supplying power source 62 with direct-current power.

Figure 9:
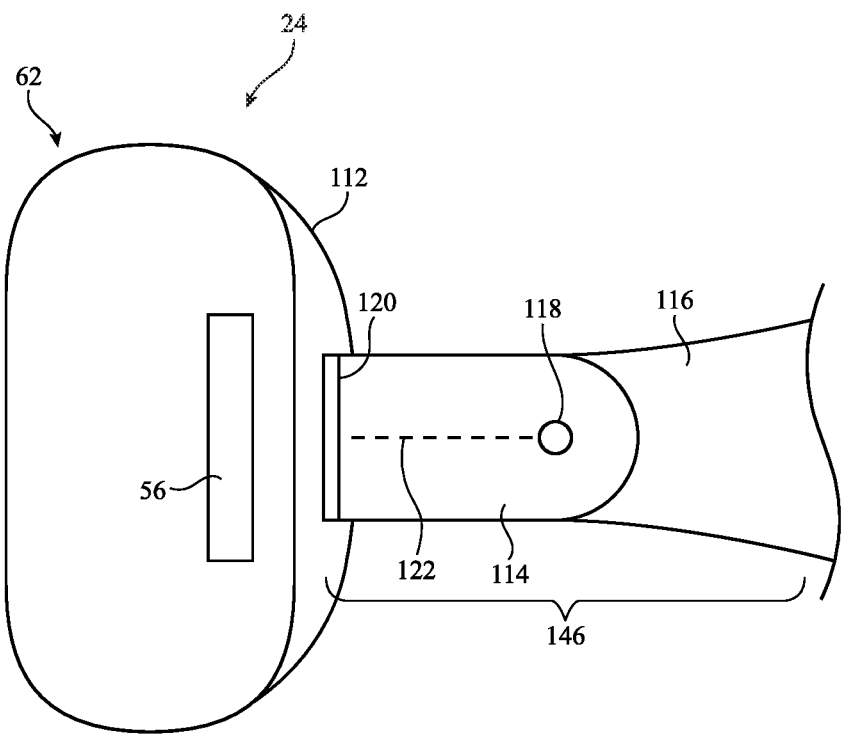
FIG. 9 is a side view of an illustrative head-mounted device in accordance with an embodiment.

FIG. 9 shows an example in which power source 62 is incorporated into an electronic device such as head-mounted device 24 (e.g., a pair of goggles, glasses, or other head-mounted device). Device 24 may, as an example, have displays, lenses, and/or other components for displaying images for a user in a support structure such as main housing portion 112. Head-mounted device 24 may include additional support structures such as strap 146 for helping attach and support main housing portion 112 on the head of a user.

Handheld controller 10 may be used to control and provide user input to device 24. Handheld controller 10 may be a virtual object in a virtual scene displayed by device 24, may be used to select virtual objects or on-screen menu options, and/or may otherwise be used to interact with device 24. For this reason, it may be convenient for a user to store and/or charge handheld controller on device 24.

Strap 146 (sometimes referred to as support structures, head-mounted support structures, a head band, a head strap, etc.) may wrap completely or partially around the user's head. Strap 146 may be formed using rigid support structures and/or flexible materials such as fabric. As shown in FIG. 9, strap 146 may include temple portions 114 and rear head strap portion 116. Temple portions 114 may include a left temple portion and a right temple portion coupled to main housing portion 112. Head band 116 may wrap at least partially around the back of the user's head and may have a first end coupled to the left temple portion 114 of head strap 146 and a second opposing end coupled to the right temple portion 114 of head strap 146. Head band 116 (sometimes referred to as a fabric band, a fabric strap, a head strap, etc.) may wrap around the back of a user's head, over the top of a user's head, and/or may otherwise couple main housing portion 112 to the user's head. Arrangements in which head band 116 includes multiple bands extending across different portions of the user's head may also be used (e.g., to form upper and lower straps across the back of the head, to form a strap over the top of the head and a strap across the back of the head, etc.). If desired, temple portions 114 may include input-output devices, sensors, and/or other circuitry, while head band 116 may be free of circuitry (as an example). Temple portions 114 maybe removable from head band 116 and/or main housing portion 112. This is merely illustrative. If desired, temple portions 114 and head band 116 may form a single continuous strap.

Power source 62 may be incorporated into device 24 for charging circuitry in device 24 and/or for charging handheld controller 10. Charging circuitry in device 24 may be formed in main housing portion 112 and/or head strap 146. In the example of FIG. 9, power source 62 in device 24 includes battery 56 in main housing portion 112. Battery 56 may be used to provide power to the circuitry of device 24 and to the circuitry of handheld controller 10. Battery 56 may receive power that is conveyed to device 24 wirelessly and may receive wall outlet power (mains alternating-current power).

In the example of FIG. 9, temple portion 114 of head strap 146 includes circuitry for conveying power to battery 56. For example, temple portion 114 may include a connector such as connector 118. Connector 118 may receive wired power from an external power source (e.g., a charging puck, a battery pack, or other stand-alone external power source such as another external power source 62 of the type shown in FIG. 3), wall outlet power, or other suitable wired power. Additionally or alternatively, wireless power may be conveyed to a coil located in temple portions 114. Power that is received via connector 118 may be conveyed to battery 56 over traces such as conductive traces 122. Conductive traces 122 may be formed from metal that has been electroplated or otherwise formed on temple portion 114. In other arrangements, traces 122 may be formed from conductive strands that are incorporated into the fabric of temple portion 114. Temple portion 114 may include a connector such as connector 120 that electrically couples to a mating connector in main housing portion 112 so that power signals on traces 122 can be conveyed to battery 56 via connector 120 (e.g., an array of electrical contacts configured to mate with corresponding electrical contacts in main housing portion 112). If desired, temple portions 114 may be removable from head band 116 and/or main housing portion 112.

Figure 10:
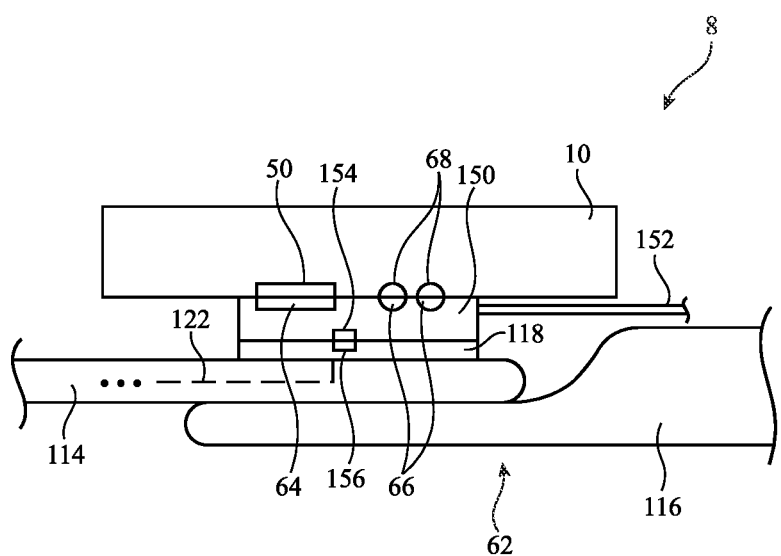
FIG. 10 is a side view of an illustrative head-mounted device to which a handheld controller has been coupled for storage and charging in accordance with an embodiment.

FIG. 10 is a side view of an illustrative head-mounted device of the type shown in FIG. 9 that is being used to store and charge a handheld controller 10. As shown in FIG. 10, power source 150 may be attached to connector 118 to provide power to head-mounted device 24. Power source 150 may include charging circuitry 154 (sometimes referred to as power transmitting circuitry) configured to align with power receiving circuitry 156. Charging circuitry 154 may include an inductive charging coil and power receiving circuitry 156 may include a power receiving coil. In other arrangements, charging circuitry 154 and power receiving circuitry 156 may include mating contacts that transfer power via direct contact or capacitive coupling. Charging circuitry 154 in power source 150 may receive power such as wall outlet power over cable 152.

Power source 150 may include additional charging circuitry for simultaneously charging handheld controller 10 and device 24. As shown in FIG. 10, handheld controller 10 may be temporarily placed on power source 150. Power source 150 may include charging circuitry such as a coil 64 and/or contacts 66 for charging handheld controller 10. During storage on device 24, the charging circuitry of power source 150 may supply power to device 10 (e.g., via direct contact between contacts 68 and 66, capacitive coupling between contacts 68 and 66, inductive power transfer between coil 64 and coil 50, etc.) while simultaneously supplying power to device 24. Magnets, press-fit structures, clips, hook-and-loop fastener material, straps, and/or other coupling structures in strap 146 and/or in power source 150 may be used to help hold device 10 in place (e.g., temporarily) on power source 150. If desired, battery 56 may be omitted, and power source 150 may supply power directly to the circuitry of head-mounted device 24 while head-mounted device 24 is in use.

Figure 11:
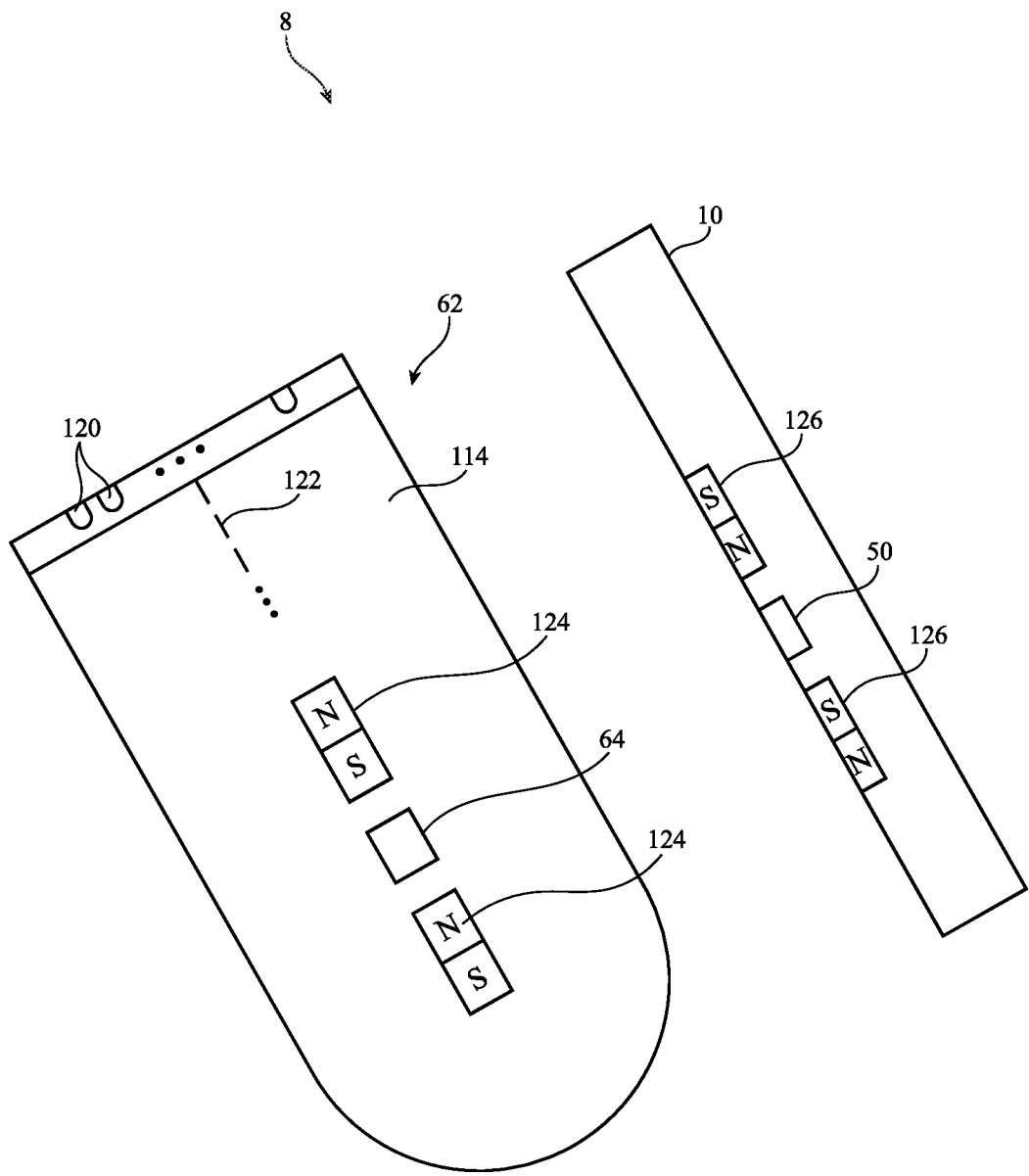
FIG. 11 is a top view of an illustrative handheld controller and a strap with magnets and charging circuitry in accordance with an embodiment.

If desired, battery 56 of head-mounted device 24 (FIG. 9) may supply power directly to handheld controller 10 without using power source 150. This type of arrangement is illustrated in FIG. 11. As shown in FIG. 11, temple portion 114 of head strap 146 may include an inductive charging coil such as coil 64. Coil 64 may receive power from battery 56 via connector 120 and traces 122. The charging circuitry of power source 62 in device 24 may supply power to device 10 (e.g., via inductive power transfer between coil 64 and coil 50, direct contact between contacts 68 and 66, capacitive coupling between contacts 68 and 66, etc.).

Magnets, press-fit structures, clips, hook-and-loop fastener material, straps, and/or other coupling structures may be used to help hold and align device 10 in place (e.g., temporarily) on temple portion 114. In the example of FIG. 11, device 10 includes magnets 126 and temple portion 114 includes magnets 124. Magnets 126 and 124 may include permanent magnets and/or structures formed from magnetic material (e.g., iron bars or other ferromagnetic members that are attracted to magnets such as electromagnets and/or permanent magnets). Magnets 126 and 124 may include north and south poles that are arranged such that magnets 126 are attracted to magnets 124 when coil 50 is aligned with coil 64 (and/or when contacts 66 are aligned with contacts 68).

Figure 12:
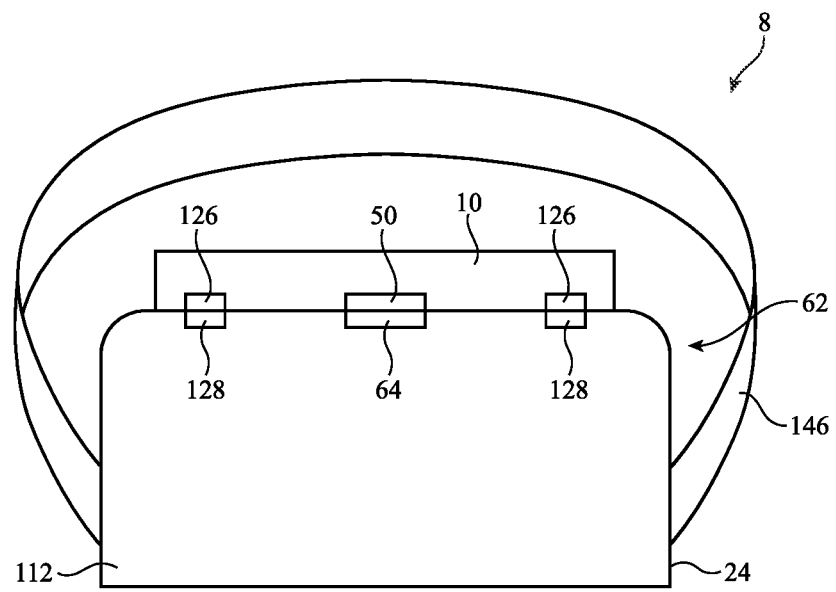
FIG. 12 is a perspective view of an illustrative head-mounted device having an upper surface to which a handheld controller is coupled for storage and charging in accordance with an embodiment.
Figure 13:
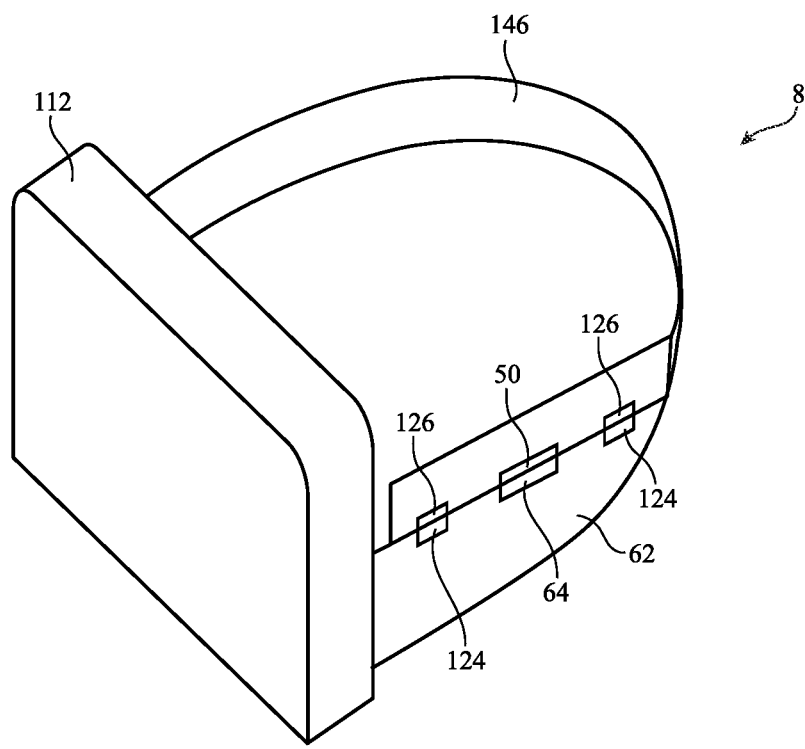
FIG. 13 is a perspective view of an illustrative head-mounted device having a head strap to which a handheld controller is coupled for storage and charging in accordance with an embodiment.
Figure 14:
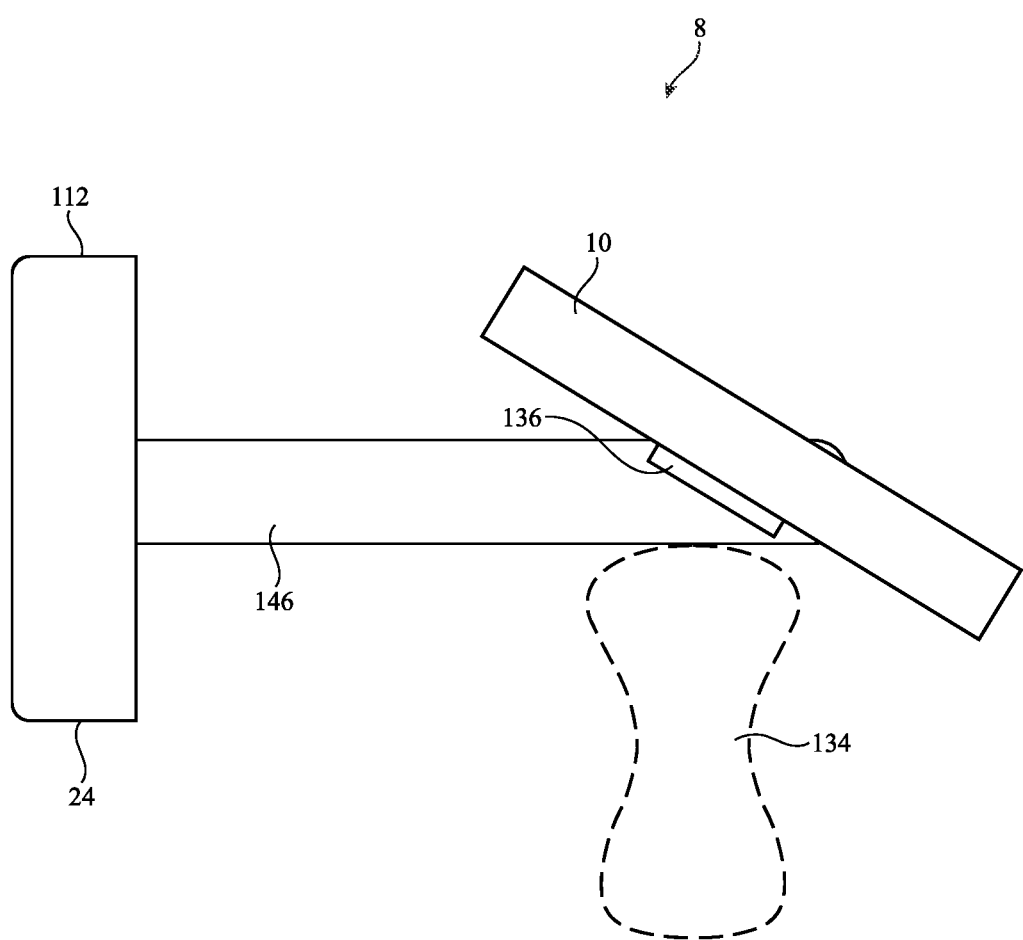
FIG. 14 is a side view of an illustrative head-mounted device having a head strap that is configured to hold a handheld controller behind a user's ear in accordance with an embodiment.

FIGS. 12, 13, and 14 show illustrative locations on device 24 that may be used for storing and/or charging handheld controller 10. In the example of FIG. 12, handheld controller 10 is temporarily coupled to main housing portion 112. Controller 10 may be coupled to an upper surface of main housing portion 112, a front surface of main housing portion 112, a side surface of main housing portion 112, a lower surface of main housing portion 112, or any other suitable portion of main housing portion 112.

Magnets, press-fit structures, clips, hook-and-loop fastener material, straps, and/or other coupling structures may be used to help hold and align device 10 in place (e.g., temporarily) on main housing portion 112. In the example of FIG. 12, device 10 includes magnets 126 and main housing portion 112 includes magnets 128 for helping align charging circuitry such as coil 64 in device 24 with coil 50 in device 10.

In the example of FIG. 13, handheld controller 10 is temporarily coupled to head strap 146. Controller 10 may be coupled to an upper surface of head strap 146, a side surface of head strap 146, a lower surface of head strap 146, or any other suitable portion of head strap 146. Magnets, press-fit structures, clips, hook-and-loop fastener material, straps, and/or other coupling structures may be used to help hold device 10 in place on head strap 146. In the example of FIG. 13, device 10 includes magnets 126 and head strap 146 include magnets 124 for helping align charging circuitry such as coil 64 in device 24 with coil 50 in device 10.

FIG. 14 is a side view of device 24 showing how controller 10 may be attached behind a user's ear. When device 24 is mounted on a user's head, head strap 146 may pass above the user's ear such as ear 134. Head strap 146 may include an attachment structure such as attachment structure 136. Attachment structure 136 may include magnets, press-fit structures, clips, hook-and-loop fastener material, straps, and/or other coupling structures for holding and aligning controller 10 on head strap 146. If desired, attachment structure 136 may be angled relative to head strap 146 such that controller 10 extends partially behind ear 134. Users may be accustomed to storing pencils behind the ear, so the ability to store controller 10 behind the ear allows for a natural movement with which the user can store device 10 on device 24. If desired, attachment structure 136 may have an adjustable position (e.g., may be adjustable relative to strap 146), so that the user can customize the location with which controller 10 is stored on device 24 (e.g., to support the best ergonomics for a particular user). If desired, arrangements in which controller 10 rests at least partially on the user's ear may also be used.

An arrangement of the type shown in FIG. 14 may be especially beneficial for providing a storage and/or charging solution for controller 10 while the user is wearing device 24. If controller 10 runs out of battery during use, the user can quickly place controller 10 on attachment structure 136 behind the user's ear 134. In other scenarios, the user may need to use free hands to handle a task while wearing device 24. The ability to quickly store controller 10 by placing controller 10 on attachment structure 136 behind the user's ear 34 allows the user to use his or her hands for a task, then easily return to using controller 10 using muscle memory to simply reach above the ear (e.g., without having to fumble around to locate controller 10 stored in a less convenient location such as on a table or in a pocket). The user may be able to return to using controller 10 without having to remove device 24 from the user's head. The ability to easily store and charge controller 10 on device 24 may also allow controller 10 to have a smaller battery and lighter form factor. Arrangements in which controller 10 includes a super capacitor to store energy between charging periods may also be used, if desired.

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device configured to store a handheld controller for the head-mounted device, wherein the handheld controller has an elongated shaft, the head-mounted device comprising:
 a main housing portion;
 a display in the main housing portion that is configured to provide an image viewable from an eye box, wherein the image is adjusted in response to user input to the handheld controller;
 a head strap configured to support the main housing portion; and
 magnets in the head strap that are configured to hold the elongated shaft against the head strap.

2. The head-mounted device defined in claim 1 wherein the head strap comprises an inductive charging coil that is configured to supply wireless power to the handheld controller while the elongated shaft is held against the head strap.

3. The head-mounted device defined in claim 2 further comprising a battery, wherein the inductive charging coil receives power from the battery.

4. The head-mounted device defined in claim 3 wherein the head strap comprises traces that convey the power from the battery to the inductive charging coil.

5. The head-mounted device defined in claim 4 wherein the battery is mounted in the main housing portion.

6. The head-mounted device defined in claim 5 wherein the head strap comprises a connector coupled to the main housing portion and wherein the connector comprises contacts that convey the power from the battery to the traces in the head strap.

7. The head-mounted device defined in claim 6 wherein the head strap comprises first and second portions, wherein the traces and the connector are located in the first portion, and wherein the first portion is removable from the second portion and the main housing portion.

8. The head-mounted device defined in claim 1 wherein the head strap comprises a connector configured to mate with a power source that supplies power to the handheld controller and the head-mounted device at the same time.

9. The head-mounted device defined in claim 8 further comprising a battery in the main housing portion, wherein the head strap comprises traces that convey the power from the connector to the battery.

10. The head-mounted device defined in claim 9 wherein the head strap comprises an additional connector coupled to the main housing portion and wherein the additional connector comprises contacts that convey the power from the traces to the battery.

11. The head-mounted device defined in claim 1 wherein the head strap comprises a temple portion and wherein the magnets are located in the temple portion and are configured to hold the elongated shaft at an angle relative to the temple portion.

12. A power source for charging a handheld controller for a head-mounted device, wherein the handheld controller has an elongated shaft extending along a longitudinal axis, the power source comprising:
 a housing;
 a recess in the housing configured to receive the elongated shaft, wherein the recess is defined by first and second opposing walls that extend along first and second opposing sides of the handheld controller, wherein the elongated shaft is inserted into the recess along a direction that is perpendicular to the longitudinal axis;
 magnets in the housing configured to hold and align the elongated shaft within the recess; and
 a battery in the housing configured to supply power to the handheld controller while the elongated shaft is received within the recess.

13. The power source defined in claim 12 further comprising an inductive charging coil configured to wirelessly supply the power from the battery to the handheld controller.

14. The power source defined in claim 12 further comprising first contacts in the housing that are configured to couple to second contacts on the handheld controller, wherein the power is supplied to the handheld controller via the first contacts and the second contacts.

15. A charging stick for charging a handheld controller having a battery and an elongated tube-shaped shaft with a first planar surface, the charging stick comprising:
 an elongated housing having a rectangular cross-section and a second planar surface configured to mate with the first planar surface of the elongated tube-shaped shaft, wherein the second planar surface forms an outer surface of the charging stick;
 an inductive charging coil configured to supply wireless power to the battery; and
 a magnet configured to align the inductive charging coil with respect to the elongated tube-shaped shaft.

16. The charging stick defined in claim 15 further comprising a cable configured to supply the power to the inductive charging coil.

17. The charging stick defined in claim 15 wherein the inductive charging coil is one of first and second inductive charging coils in the charging stick, wherein the handheld controller is one of first and second handheld controllers, and wherein the first inductive charging coil is configured to supply power to the first handheld controller and the second inductive charging coil is configured to supply power to the second handheld controller at the same time.

* * * * *